Jan. 5, 1960
O. BREDESON
2,919,665
CULTIVATING AND SEEDING APPARATUS
Filed April 28, 1958
2 Sheets-Sheet 1
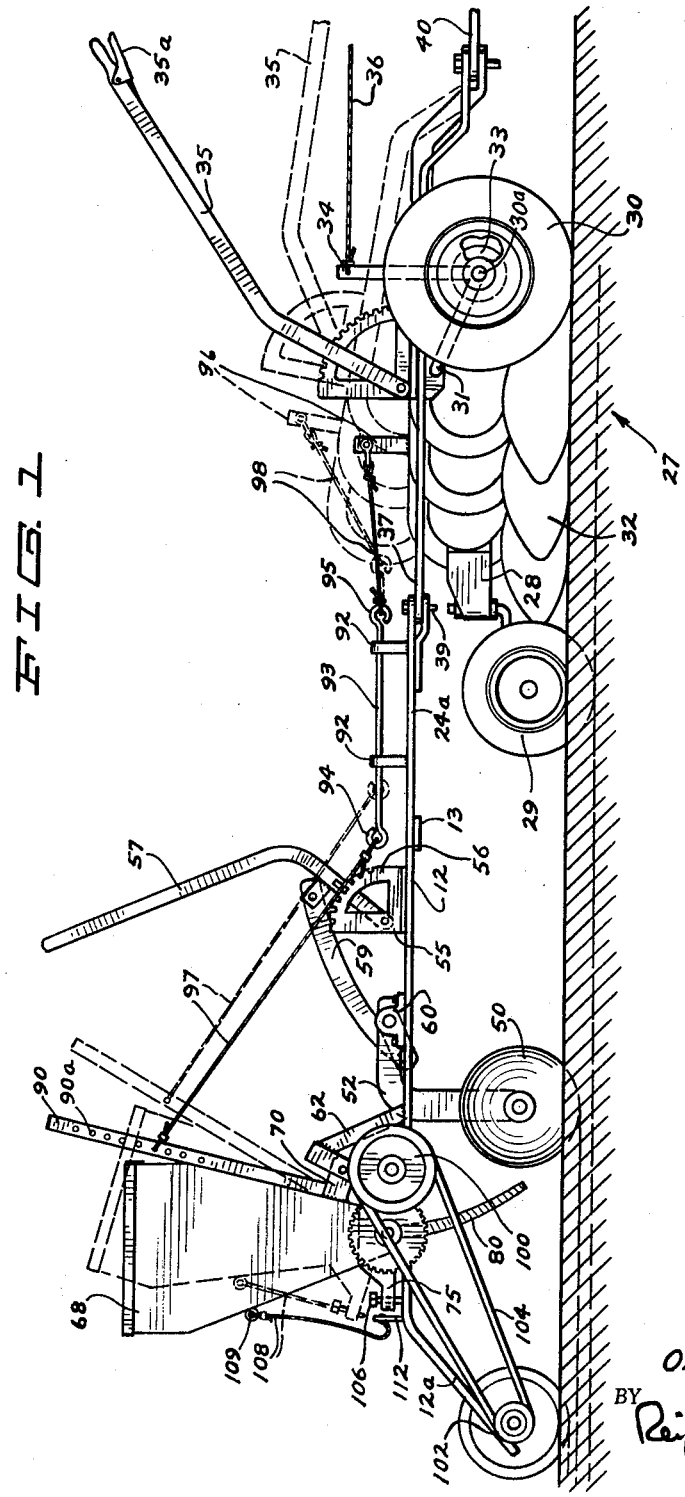
INVENTOR.
OLIVER BREDESON
BY
ATTORNEYS Jan. 5, 1960 O. BREDESON 2,919,665
CULTIVATING AND SEEDING APPARATUS
Filed April 28, 1958 2 Sheets-Sheet 2
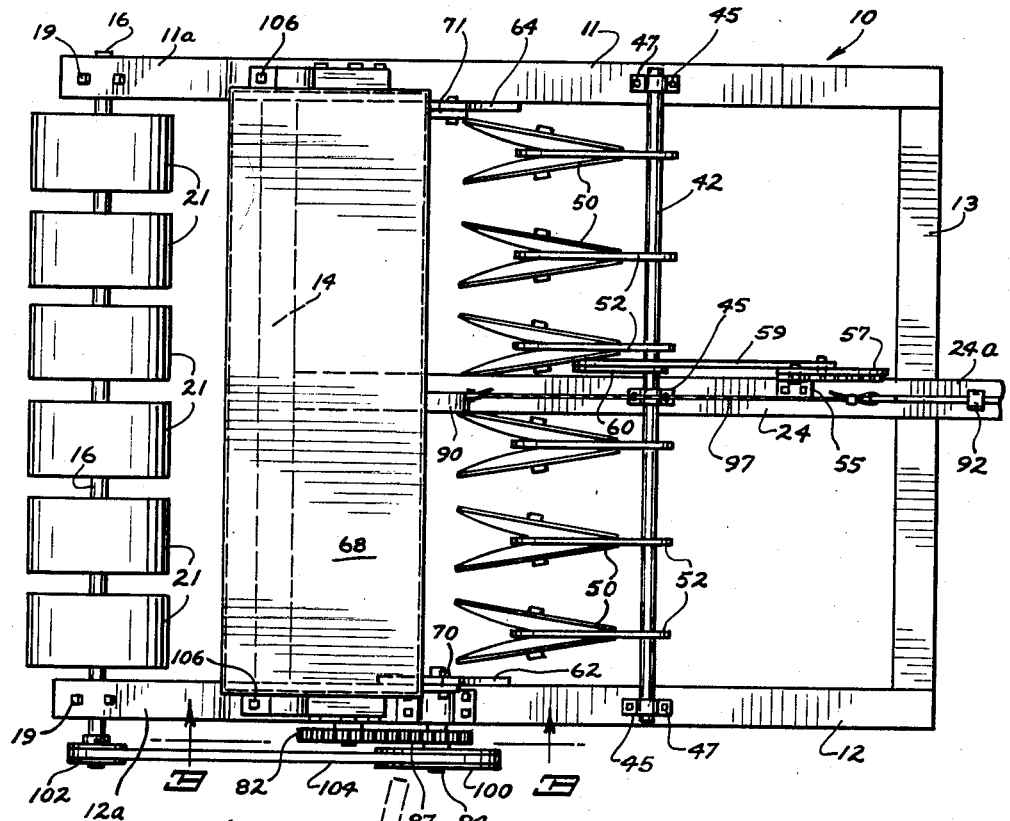
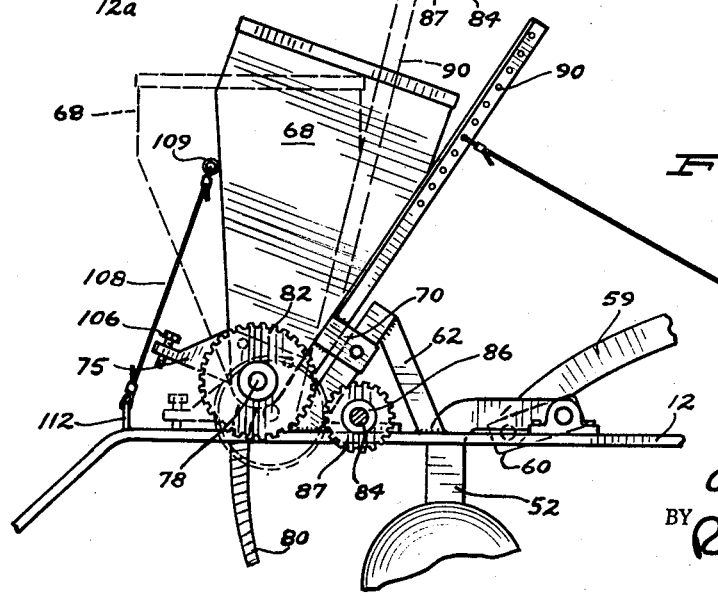
INVENTOR.
OLIVER BREDESON
BY
ATTORNEYS United States Patent Office 2,919,665
Patented Jan. 5, 1960

2,919,665
CULTIVATING AND SEEDING APPARATUS
Oliver Bredeson, Rochester, Minn.
Application April 28, 1958, Serial No. 731,394
3 Claims. (Cl. 111—67)

This invention relates to an apparatus for cultivating and seeding soil in one coordinate operation. It is desirable to have an apparatus embodying therein the use of a single control member for controlling the plowing and seeding operation whereby both plowing and seeding can be terminated simultaneously by the action of said control.

In the use of a hopper the seeding mechanism therein is commonly gear driven and it is commonly connected to a driving means by a clutch mechanism. The gears and the clutch involved are exposed to all types of weather conditions and generally become rusted and accumulate dirt and grit therein which makes the manual disengaging or engaging operation of the clutch mechanism difficult. It is desirable to have a driving means for the seeding mechanism of said hopper which can be easily and quickly disengaged for placing said seeding mechanism in inoperative position and easily engaged for operative position. It is also desirable to have a control means in connection with said hopper for adjustment to make possible certain different degrees of engagement between the driving means and the driven seeding mechanism of said hopper.

It is an object of this invention to provide a common means whereby both the plow and the hopper can be placed in inoperative position simultaneously by the operation of a single control means.

It is another object of this invention to provide a mobile frame having a hopper pivotally mounted thereon in connection with a drill and plow, and means carried by said frame for driving the seeding mechanism of said hopper whereby said hopper can easily and quickly be disengaged from said driving means by the same control lever used for placing the plow in inoperative position.

It is also an object of this invention to provide an adjusting means in connection with said hopper whereby said hopper may be positioned for certain different degrees of engagement between a driving means and the driven seeding mechanism in said hopper.

It is also a further object of this invention to provide means for constantly urging the seeding mechanism to operative position.

These and other objects and advantages of the invention will be fully set forth in the following description made in connection with the accompanying drawings in which like reference characters refer to similar parts throughout the several views and in which:

Fig. 1 is a view of applicant's apparatus in side elevation showing various portions thereof in different positions in dotted lines;

Fig. 2 is a top plan view of a substantial portion of applicant's apparatus with some parts thereof shown in dotted lines; and Fig. 3 is a broken view showing the seeding mechanism of applicant's apparatus in side elevation on an enlarged scale and showing the same in a different position in dotted lines.

Referring to the drawings, a frame 10 is shown substantially rectangular in plan having side frame members 11 and 12, a forward cross frame member 13 and a rearward cross frame member 14. The rearward portions 11a and 12a of the side frame members 11 and 12 respectively are inclined downwardly and have journaled to their lower end portions a shaft 16. Said shaft 16 will be secured to said portions 11a and 12a by bearings 19 of a common variety and not here illustrated. Secured on said shaft 16 are a plurality of spaced packing wheels 21. Extending centrally longitudinally of said frame 10 is a frame member 24 having a forward extending portion forming a tongue 24a.

With reference to Fig. 1, shown generally by character 27, is a gang plow of well known construction having a basic frame 28 supported on wheels 29 and 30. Mounted on said frame are plows 32 adapted to have their cutting depth controlled by lever 35. The operative relationship between said lever 35 and said plows 32 is a common and well known construction and not here further described. A grip release member 35a for lever 35 is provided at the outer end of said lever 35.

In a well known and conventional manner a lifting crank 31 connects an upper portion of plow frame 28 and a rear plow axle 30a. The axle end of said crank will be secured to the conventional construction of a mating portion of a ratchet gear 33 which will be journaled on said axle and adapted to mate with its facing portion secured on said axle. A conventional gear engaging bar 34 with a convenient rope pull 36 is provided for causing the engagement and disengagement of the mating portions of said ratchet gear 33. There is no novelty present here, the details of construction here omitted are all well known, and it is believed that no further detail is necessary. Thus when the mating portions of said gear 33 are engaged, the lifting crank 31 will be moved to a vertical position and cause the plow frame to be moved upwardly and forwardly bringing the plows 32 out of the soil.

Said plow 27 is provided with a draw bar 37 to which is pivotally connected the bifurcated end of said tongue 24a by a pivot pin 39. Said draw bar 37 at its forward end portion has pivoted thereto a draw bar 40 of which only a broken portion is shown in Fig. 1 and which will extend to a pulling means, such as a tractor.

Journaled on said frame 10 somewhat to the rear of said plow 27 is a shaft 42 held in position on said frame 10 by bearings 45. Said bearings will be secured in position by suitable means, such as bolts 47. Connected to said shaft 42 and spaced transversely of said frame 10 are a plurality of pairs of disks 50. Said disks will be journaled onto the lower ends of right-angled supporting members 52. Said members 52 at their upper ends are secured to said shaft 42. Said disks 50 are of a common and ordinary construction mounted in pairs with said disks being at an angle one to the other whereby upon rotation said disks open a furrow therebehind into which seeds may be dropped.

Pivoted to an upstanding bracket 55 on said central frame member 24 is a lever 57. Connecting said lever 57 and said shaft 42 are coupled link members 59 and 60. Said link 59 is of substantial length and said link 60 is of a short length. Said link 60 at its free end is secured to said shaft 42, as by welding, whereby when said lever 57 is moved rearwardly said disks 50 will be raised to inoperative position. Said lever 57 will be moved rearwardly sufficiently whereby said links 59 and 60 will be positioned below a dead center position relative to said lever 57 and said disks 50. A quadrant 56 is provided in connection with said lever 57 to adjust the depth of said disks 50 in the soil.

Secured to said side frame members 11 and 12 somewhat centrally of frame 10 are upstanding brackets 62 and 64 here shown to be inverted V-shape in form. A hopper 68 is mounted on said frame 10. Said hopper extends substantially across the width of said frame 10 having a narrowed bottom portion with upwardly inclined diverging side portions with said sides having upper parallel upper portions whereby the top portion of said hopper is substantially parallelepiped in form. Said hopper may be variously formed in other embodiments of applicant's invention. Said hopper 68 is pivoted to said brackets 62 and 64. In the embodiment of the invention here illustrated, said hopper has secured thereto adjacent the bottom portion thereof, lug portions 70 and 71 respectively pivoted to brackets 62 and 64. Said hopper is provided with a rearwardly projecting portion 75 at either side thereof rearwardly thereof. Said projection is only shown at one side of said hopper, as indicated in Figs. 1 and 3. Extending transversely through the bottom portion of said hopper is a shaft 78. Said shaft is adapted to operate the seeding mechanism of said hopper. Said seeding mechanism will be of a type commonly used and no novelty is here claimed in such mechanism. Said mechanism will be adapted to discharge seeds through the downwardly extending spouts 80. Said spouts will be spaced across the width of said hopper in alignment with said disks and will be respectively adapted to drop seeds into the furrows opened by the disks 50. Thus there is a specific operational relationship between said disks and said hopper. Said shaft 78 is adapted to have one end extend outwardly of said hopper 68, as indicated in Fig. 3. Secured to said outer end of said shaft 78 is a gear 82 of substantial diameter. Secured to said frame member 12 is a stub shaft 84 journaled in a bracket 86 and has secured thereon a gear 87. Said gear 87 is positioned for engagement with said gear 82 when said hopper 68 is in operating position.

Secured to said hopper 68 centrally transversely thereof and extending upwardly thereof is a handle member 90 by means of which said hopper may be tilted forwardly. Thus it is seen that when said hopper 68 is tilted forwardly said gear 82 will be moved away from engagement with said gear 87.

Upstanding from said central frame member 24 are apertured brackets 92 through which is disposed a rigid link member 93 having eyelet portions 94 and 95 at either end thereof. Said link member 93 will be of sufficient length to have substantial longitudinal movement forwardly and rearwardly through said brackets 92. A flexible connecting member 97, such as a rope or cable, will be used to connect handle 90 and the eyelet 94 of said link 93. Said handle 40 will have a plurality of apertures 90a therein whereby said member 97 may be connected to said handle 90 at any certain desirable point. A flexible connecting member 98, such as a rope or a cable, will connect eyelet 95 of said link 93 to an upstanding apertured bracket 96 carried on said plow frame 28.

Secured to said stub shaft 84 at the outer side of gear 87 is a pulley 100. Secured to said shaft 16 in alignment with said pulley 100 is a second pulley 102. Said pulleys will be adapted to have pass thereover a belt 104. Said pulleys 100 and 102 may be variously formed, such as being adapted to have a belt of a link chain type pass thereover, but in the embodiment of the invention here illustrated, said belt is indicated as being of the V belt type with said pulleys being adapted to carry the same.

Carried in the outer end of said portions 75 are adjusting members 106. Said adjusting members may be variously formed, but are here shown as screw type members adapted to be threaded through said projecting portions 75 for engagement with the frame members 11 and 12 for the purpose of adjusting the upright position of said hopper 68. It is readily seen that the degree of engagement between said gears 82 and 87 can be nicely adjusted by said adjusting member 106.

A resilient member 108 here indicated as being a coiled spring is provided having one end secured to an eyelet 109 carried on hopper 68 centrally thereof and having its lower end secured centrally of an upstanding plate member 112 extending crosswise between said frame members 11 and 12 adjacent the rear side of said hopper 68. Said member 108 is adapted to resiliently urge said hopper 68 to operating position.

In normal operating position said hopper 68 will be in upright position resiliently held in such position by member 108 which holds said hopper from jarring upwardly and downwardly excessively as applicant's apparatus is moved in operation. Said adjusting member 106 will be adjusted to have a certain desired degree of engagement between gears 82 and 87. As in the instance when the teeth of said gears may become somewhat worn, said adjusting member 106 may be threaded upwardly to permit said hopper 68 to tilt backwardly slightly for closer engagement between said gears. The packing wheels 21 when applicant's apparatus is in motion will rotate said shaft 16 and drive said belt 104 to drive pulley 100 and the gear 87 which moves integral therewith. Said gear 87 drives gear 82 and thus operates the seeding mechanism in said hopper 68.

Applicant's plows 32 will initially break the soil which will be pulverized by said disks 50 and said disks 50 respectively leave therebehind furrows into which seeds are dropped through the seeding spouts 80. Said seeding spouts are respectively aligned with said disks to have the seeds therefrom drop into the furrows opened. Said packing wheels 21 are adapted to respectively pack over said furrows.

When it is desired to move the apparatus to an operating location, or when reversing direction at the end of a furrow, or for various other reasons, it is desirable to have the plows and the hopper placed in inoperative position. It is desirable to have this done quickly and by the operation of a single control means. The plows of a gang plow such as that here indicated are commonly raised to an inoperative position by a crank lever, such as lever 31. The seeding mechanism of a hopper is commonly connected to a driving means by a clutch mechanism operated by a hand lever. With apparatus such as applicant's being exposed to all kinds of weather conditions, the operating mechanism tends to accumulate rust, dirt and grit of various kinds which make the operation of any mechanism, such as a clutch mechanism, very difficult. It is commonly necessary for an operator to dismount from the tractor used to pull the apparatus in order to approach the hopper and manually disengage its seeding mechanism. The applicant's hopper in being pivotally mounted on the frame 10 need only be tilted forwardly to have its seeding mechanism quickly disengaged from the driving gear 87. This is accomplished by having applicant's hopper connected to his bracket 96 or plow frame 28 by links 93, 97 and 98. Thus when the lifting crank 31 is operated by rope pull 36, said plow frame is moved upwardly and forwardly, the hopper 68 is tilted forwardly simultaneously with the movement of the plow frame to be placed in inoperative position also.

When the lifting crank 31 is released to lower the plows, the hopper 68 is urged directly and positively to operating position by the spring member 108.

Thus it is seen that I have provided a cultivating and seeding apparatus combining in one operating unit the complete tilling or cultivating of the soil, sowing of the seed and packing of the seed in the soil. An efficient, simple and novel driving means is provided for operating the seeding mechanism in the hopper and said hopper may be quickly and efficiently moved to inoperative position by the operation of a remote lever which also controls the operation of the plow. A novel means is also provided for very nicely adjusting the position of the hopper 68 to bring about a desired degree of engagement between the driving means used and the driven means for operating the seeding mechanism in said hopper. Applicant's apparatus has proved very successful in use.

It will of course be understood that various changes may be made in the form, details, arrangement and proportions of the parts, without departing from the scope of applicant's invention, which, generally stated, consists in an apparatus capable of carrying out the objects above set forth, in the parts and combinations of parts disclosed and defined in the appended claims.

What is claimed is:

1. A seeding apparatus having in combination, an upstanding hopper extending transversely of a wheel-supported frame, said hopper having openings in the bottom thereof, arms extending forwardly at either end of said hopper, means for pivotally supporting said arms on said frame, a projection extending rearwardly of said hopper, a pair of spaced set screws extending through said projection adjacent either end of said hopper for adjustably supporting said hopper at the rear thereof, a shaft extending the width of said hopper adjacent the bottom thereof and having one end extending for a short distance outwardly of one end of said hopper, said shaft having means for discharging seed from said hopper through said openings, a gear secured to the extended portion of said shaft adjacent said end of said hopper, a stub shaft on said frame adjacent the front of said hopper, a gear secured to said stub shaft in alignment with said first gear for operatively engaging the same, said set screws adapted to adjust the height of said hopper to adjust the degree of engagement between said gears, a pulley secured to said stub shaft adjacent to said gear thereon, a pulley operatively secured to a wheel of said frame to be driven by said wheel, a belt passing over said pulleys whereby said pulley and gear on said stub shaft are driven by said second mentioned pulley and in turn drive said first mentioned gear, means for tilting said hopper forwardly to disengage said gears, and a plurality of furrow openers secured to said frame in front of said hopper whereby seed is discharged into the furrows formed by said furrow openers.

2. The structure set forth in claim 1, a coiled spring connecting an upper rear portion of said hopper and said frame to resiliently hold the rear portion of said hopper and said set screws against said frame.

3. A seeding apparatus having in combination, an upstanding substantially V-shaped hopper in cross section extending transversely of a wheel-mounted frame, said hopper having openings in the bottom thereof, an operating shaft in said hopper extending outwardly at one end thereof, a gear secured to said extended end of said shaft adjacent said end of said hopper, a stub shaft journaled on said frame adjacent the front of said hopper, said shaft having means for discharging seed from said hopper through said openings, a gear secured to said stub shaft adapted to engage said first mentioned gear, a pulley secured to said stub shaft adjacent said gear thereon, a second pulley operatively secured to a wheel of said frame to be driven thereby, a belt passing over said pulleys, an arm adjacent either end of said hopper spaced somewhat upwardly from the bottom thereof, an upstanding bracket at either side of said frame respectively in alignment with said arms, said arms being respectively pivoted to said brackets, a bar extending upwardly centrally of the front of said hopper, said bar having a plurality of vertically spaced apertures at the upper end portion thereof, a cable having one end secured to said bar through one of said apertures, a rod extending horizontally longitudinally of said frame, a pair of guides spaced longitudinally of said frame for supporting said rod, said cable being secured at its other end to the rear end of said rod, a lever mounted on said frame, means for connecting the other end of said rod to said lever, whereby when said lever is moved to draw said rod forwardly, said hopper is tilted forwardly to disengage said first mentioned gear from said second mentioned gear, said hopper having a bottom rearwardly extending projection, a pair of set screws extending downwardly through said projection adjacent either end of said hopper, said set screws being adapted to rest on said frame and adjustably support said projection and the rear of said hopper as to height from said frame and to adjust the degree of engagement between said first and second gears, resilient means connecting the rear of said hopper and said frame for holding said hopper in a steady position on said frame, and a plurality of furrow openers secured to said frame in front of said hopper whereby seed is discharged into the furrows formed by said furrow openers.

References Cited in the file of this patent

UNITED STATES PATENTS

| | | |
|---|---|---|
| 669,126 | Sobey | Mar. 5, 1901 |
| 1,048,895 | Schmeling | Dec. 31, 1912 |
| 1,864,280 | Scarlett | June 21, 1932 |
| 2,396,980 | Blue | Mar. 19, 1946 |